Sept. 13, 1955     B. F. RAYNES     2,717,788
CORRUGATED EXPANSIBLE CLAMP FOR PIPE JOINT
Filed July 7, 1951
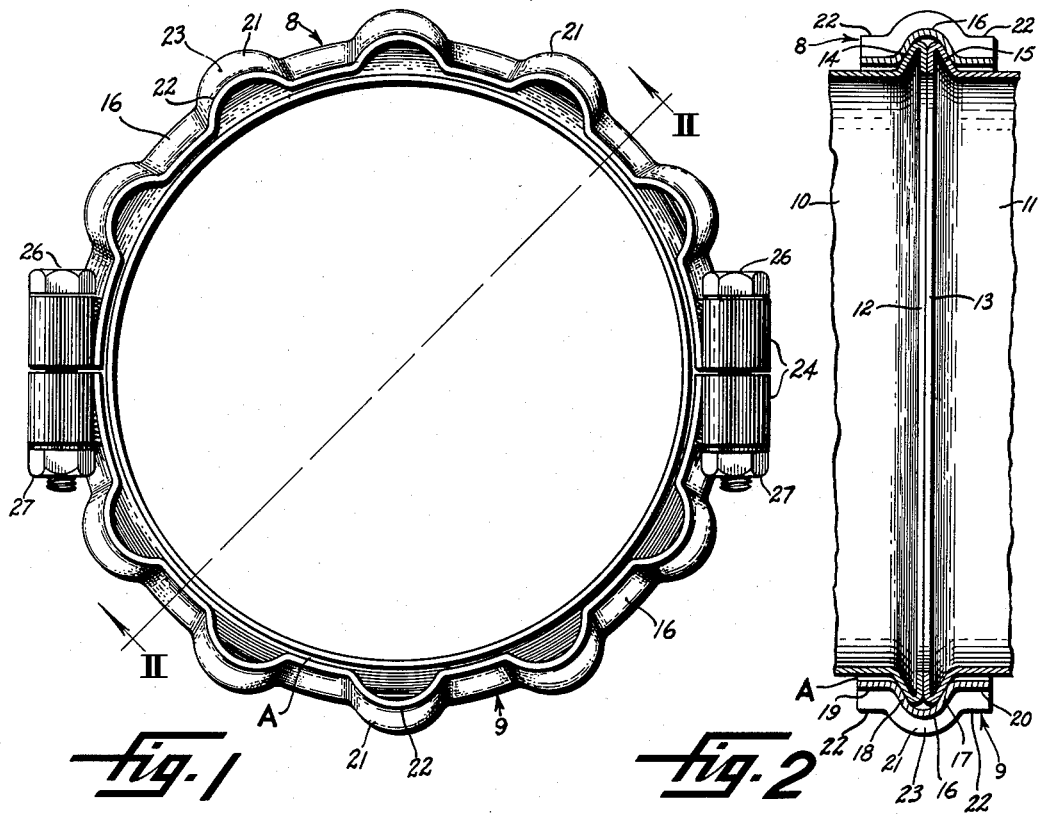
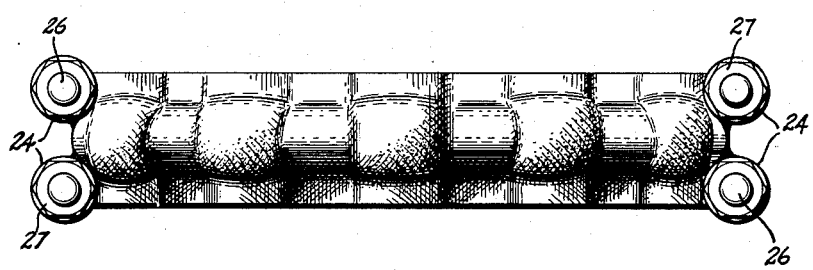
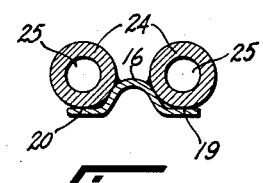
BURT F. RAYNES
    *INVENTOR.*
BY S. Tierney Jr.
   ATTORNEY

United States Patent Office 2,717,788
Patented Sept. 13, 1955

2,717,788
CORRUGATED EXPANSIBLE CLAMP FOR PIPE JOINT

Burt F. Raynes, Chula Vista, Calif.

Application July 7, 1951, Serial No. 235,661

3 Claims. (Cl. 285—129)

This invention relates to a clamp for clamping two members together in assembled relation. While it is especially adapted for clamping members which become heated considerably in use as, for example, tube sections conveying hot vapors or gases; it is of equal utility for clamping together members which remain at normal atmospheric temperature.

It is an object of this invention to provide a clamp which may be tightened to adequately clamp two parts together without the possibility of rupturing the clamp or the bolts used in tightening it by stresses arising from differential expansion of the clamped parts.

Another object is the provision of a clamp capable of clamping together two members which are subject to differential temperature changes while continually maintaining a tight joint between them.

A further object is to provide means for stiffening a clamp in a manner which increases its capacity to effectively hold two flanges together.

Another object is the provision of a clamp capable of a considerable amount of expansion or contraction circumferentially without interfering with its capacity to effectively clamp two members together.

Other objects and features of the invention will become apparent as the description thereof proceeds. For a better understanding of the invention reference is made to the accompanying drawings, in which:

Figure 1 is a front view of a clamp embodying the invention embracing two connected tubes, Figure 2 is a sectional view of Figure 1 taken along the line II—II.

Figure 3 is a bottom view of the clamp shown in Figure 1 and,

Figure 4 is a sectional view showing a portion of the clamp and its securing lugs.

In the usual type of clamp for clamping two tubular members together, there is always the possibility of overtightening the nuts on the clamp bolts. The large stresses so produced may result in fracturing the clamp or bolts. This fracturing of the bolts or clamp may also result from excessive stresses caused by the differential expansion of the connected tubes resulting from the passage of hot gases through them. According to the present invention these excessive stresses are avoided by providing the clamp so designed that it is free to lengthen somewhat in a circumferential direction when the temperature of the tubes increases.

According to the invention, the expansion of the clamp mentioned is made possible by the provision of spaced apart corrugations extending transversely of the clamp. It is found that such corrugations also stiffen the clamp so that it may not be accidentally bent out of shape in a way which endangers its proper clamping action.

The clamp shown comprises similar upper and lower members 8, 9, each stamped from sheet metal as, for example, steel, and pressed into the shape shown. The clamp illustrated is shaped so as to clamp together two sections 10, 11 of metal tubing whose ends are deformed to provide inwardly turned meeting flanges 12, 13 and oppositely sloping wall sections 14, 15. Each clamp member is bent along its center to provide a curved wall section 16 which connects together the sloping walls 17, 18 adapted to be pulled against the walls 14, 15 to effect the clamping action. Walls 17, 18 terminate in circumferential portions 19, 20 which extend parallel to the wall of tube 10, 11 but are spaced a small distance therefrom even when the clamp is tightened, as shown at "A" in Figures 1 and 2.

The metal of the clamp is also deformed by a pressing operation to form a series of spaced apart corrugations 21 which extend transversely across the full width of the clamp. Each corrugation thus has an arch portion 22 at each end which is connected to a central arch portion 23 disposed at a distance above the level of the wall portion 16.

Attached as by welding, to the ends of each of clamp members 8, 9 are two short cylindrical lugs 24 (see Figure 4). Each lug has a hole 25 adapted to receive a bolt 26. It will be clear that when nuts 27 provided on the bolts 26 are tightened, lugs 24 are pulled into contact and the mating clamp members 8, 9 are drawn together to an extent sufficient to cause the tube flanges 12, 13 to be pressed firmly together and effect a tight connection of the tubes 10, 11.

In the absence of the corrugations provided by this invention, the metal of the clamp in the region 16 might become bent due to stresses caused by differential expansion so that the sloping walls 17, 18 separated or opened up somewhat. In this event, sufficient pressure would not be applied to the sloping walls 14, 15 of the tube to bias the flanges 12, 13 firmly enough together to make a tight joint. The corrugations provided by this invention stiffen the metal not only in the region 16 but throughout the entire width of the clamp and greatly reduce the possibility of failure of the clamp arising from bending of the metal.

The corrugations provided have an important function in permitting the clamp to lengthen circumferentially to some extent when the clamp bolts 26 are tightened. In a clamp without corrugations, these bolts may inadvertently be tightened enough to over stress the clamp, the lugs 24 or the bolts themselves and cause failure of the clamp. The corrugations, however, permit the metal to flex across the corrugations to an extent sufficient to permit the lugs 24 to be pulled into contact without over tightening of the bolts.

In addition, clamps of this nature are used to connect tubes which become highly heated when conveying hot gases as, for example the exhaust manifolds of internal combustion engines. The corrugations provided by this invention permit the clamp to be fully tightened when the tube is cold so as to secure a tight joint between flanges 12, 13. Upon heating and differential expansion of the tube, the flexure of the clamp metal across the corrugations permits the clamp to lengthen circumferentially to accommodate the increased diameter of the tube. This action obviates the possibility of undue stresses being set up in any part of the clamp which might endanger its proper operation. Also as the tube cools, the clamp likewise cools by a differential amount and the corrugations do not prevent the clamp diameter from decreasing along with the tube diameter. The use of the corrugations thus assures proper clamping performance for differential temperature variations.

My invention may be embodied in other specific forms without departing from the spirit or essential characteristics thereof. The present embodiment, as herein set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

Having thus described my invention, what I claim as new and useful and desire to secure by Letters Patent is:

1. A clamp formed of flexible metal adapted to press together the abutting ends of two aligned rigid tubes having cylindrical ends terminating in a pair of annular converging walls; said clamp having a series of spaced apart arcuate portions, each arcuate portion having an arch shaped central section arranged to be drawn into engagement with said converging walls and terminating in a pair of oppositely extending edges parallel to the walls of said cylindrical tube ends, each of said arcuate portions extending along the surface of said converging walls for at least several degrees about the axis of said cylindrical tube ends; outwardly projecting corrugations connecting said arcuate portions together and extending the entire width thereof, the cross sectional shape of said corrugations in a direction transverse to the length of the clamp being substantially similar to that of said arcuate portions; and screw threaded fasteners arranged to draw the arch shaped sections of said arcuate portions against said converging walls while leaving said corrugations free to bend slightly in response to changes in temperature of the tubes.

2. A clamp as claimed in claim 1; in which hollow cylindrical lugs are secured to each of said oppositely extending edges at each of the adjoining ends of the clamp, said lugs being arranged to receive said screw threaded fasteners.

3. A clamp as claimed in claim 2; in which said oppositely extending edges are spaced from the cylindrical walls of the tube ends when said arch shaped sections are in contact with said converging walls.

References Cited in the file of this patent

UNITED STATES PATENTS

| | | |
|---|---|---|
| 233,145 | Demarest | Oct. 12, 1880 |
| 946,207 | Doak | Jan. 11, 1910 |
| 1,173,998 | Depew | Feb. 29, 1916 |
| 2,269,664 | Hallerberg | Jan. 13, 1942 |